United States Patent
Saito et al.

(10) Patent No.: US 7,991,093 B2
(45) Date of Patent: Aug. 2, 2011

(54) ANALOG/DIGITAL CIRCUIT

(75) Inventors: Koji Saito, Kyoto (JP); Hisashi Furumoto, Kyoto (JP)

(73) Assignee: Rohm Co., Ltd. (JP)

( * ) Notice: Subject to any disclaimer, the term of this patent is extended or adjusted under 35 U.S.C. 154(b) by 783 days.

(21) Appl. No.: 12/028,176

(22) Filed: Feb. 8, 2008

(65) Prior Publication Data
US 2008/0192875 A1   Aug. 14, 2008

(30) Foreign Application Priority Data

Feb. 9, 2007  (JP) ................................. 2007-031016
Nov. 29, 2007 (JP) ................................. 2007-309116

(51) Int. Cl.
*H04L 7/00* (2006.01)
(52) U.S. Cl. ........................................................ 375/354
(58) Field of Classification Search .................. 375/354
See application file for complete search history.

(56) References Cited

U.S. PATENT DOCUMENTS

| | | | |
|---|---|---|---|
| 4,823,390 A * | 4/1989 | Wittrock | 381/4 |
| 6,535,719 B1 * | 3/2003 | Suzuki et al. | 455/112 |
| 7,224,302 B2 * | 5/2007 | Dornbusch | 341/143 |
| 2009/0002089 A1 * | 1/2009 | Karr | 332/117 |

FOREIGN PATENT DOCUMENTS

| | | |
|---|---|---|
| JP | 8-191232 | 7/1996 |
| JP | 8-256135 | 10/1996 |
| JP | 9-69729 | 3/1997 |
| JP | 9-312588 | 12/1997 |
| JP | 10-13370 | 1/1998 |

OTHER PUBLICATIONS

"United States RBDS Standard" Publisher: National Radio Systems Commitee, U.S.A., Published Apr. 9, 1998.

* cited by examiner

*Primary Examiner* — Juan A Torres
(74) *Attorney, Agent, or Firm* — Cantor Colburn LLP

(57) ABSTRACT

A digital filter operates on the basis of a first clock having a first frequency. A stereo modulator operates on the basis of a second clock having a second frequency higher than the first frequency and being asynchronous. The stereo modulator performs a predetermined process on output data of the digital filter. A frequency modulator operates on the basis of a third clock having a third frequency whose origin is the same as that of the second clock, and performs frequency modulation on an output signal of the second digital computing unit. A sampling converter receives output data having the first frequency from the digital filter, converts a sampling frequency to data synchronized with the second clock, and outputs the obtained data to the stereo modulator.

5 Claims, 3 Drawing Sheets

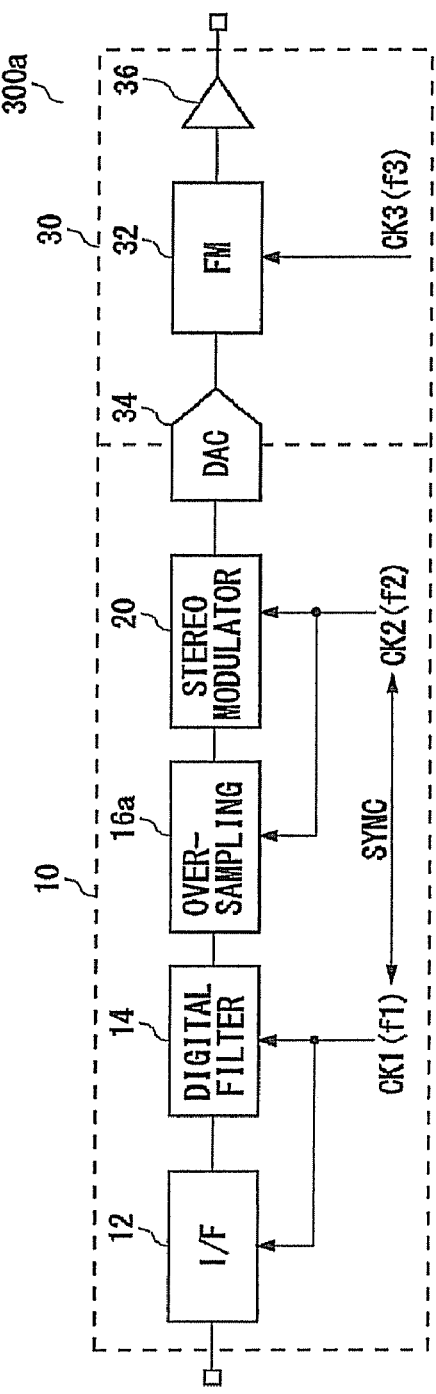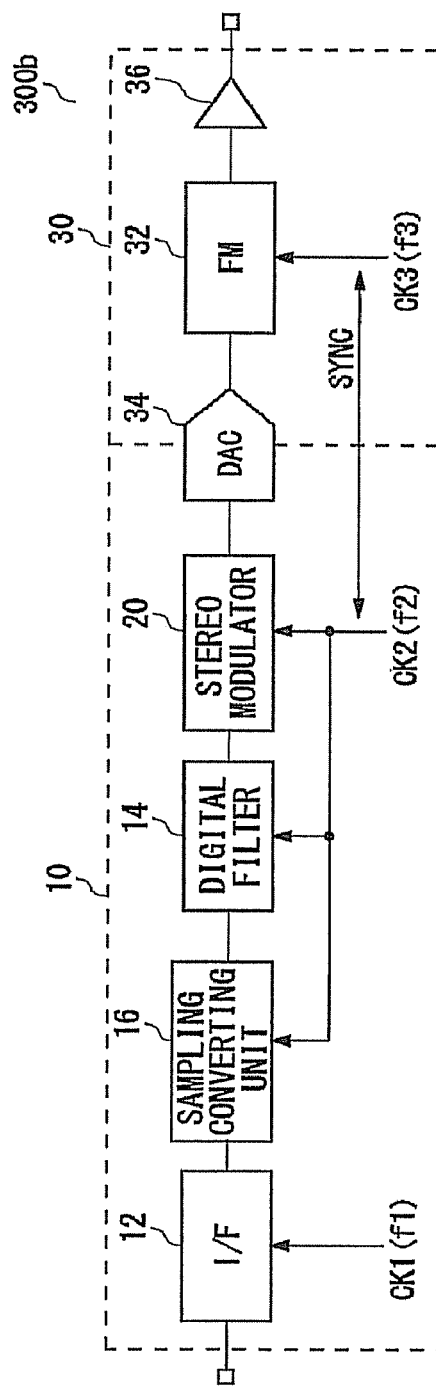
FIG. 2A
FIG. 2B

ANALOG/DIGITAL CIRCUIT

BACKGROUND OF THE INVENTION

1. Field of the Invention

The present invention relates to an analog/digital circuit.

2. Description of the Related Art

In recent years, an FM radio station in Europe and a radio broadcast station in U.S. transmit additional information such as text as information in an RDS (Radio Data System) in Europe or RBDS (Radio Broadcast Data System) in U.S. By using the RDS/RBDS, in a receiver such as a car radio, various information such as the name of a broadcast station which is presently tuned, genre of music, and the like can be used (Japanese Patent Application (Laid Open) Nos. H8-256135 and H8-191232).

On the other hand, an FM transmitter for converting an audio signal to a stereo composite signal, performing frequency modulation by using a frequency modulator, and outputting the frequency modulated signal is known (Japanese Patent Application (Laid Open) Nos. H9-069729, H10-013370, and H9-312588). By using the FM transmitter, the audio signal can be transmitted without using a wire such as an RCA cable. Consequently, the FM transmitter can be used for transmitting signals between a CD changer in a car audio system and a head unit. Moreover, in recent years, a hard disk audio device, a memory audio device, and a cellular phone terminal having the music reproduction function are markedly being spread. The FM transmitter is used also for the application of reproducing music data stored in such a small electronic device from a speaker of a stationary audio component or the like.

Generally, the FM transmitter includes a filter unit, a stereo modulator, and a frequency modulator. The filter unit includes a pre-emphasis filter and a low-pass filter. The stereo modulator performs stereo-modulation on an output of the filter unit, thereby generating a stereo composite signal. The frequency modulator modulates the frequency of a carrier wave using the stereo composite signal as a modulation signal.

[Non-patent document 1] National Radio Systems Committee, "United States RBDS Standard", U.S., Apr. 9, 1998

A study will be made on the case of providing a digital-to-analog converter (hereinbelow, simply called DA converter) between a stereo modulator and a frequency modulator, performing a stereo modulation process in a digital manner, and performing frequency modulation in an analog manner.

Generally, the operation clock of the filter unit and that in the stereo modulator for performing the digital process are different from each other. The operation clock of the stereo modulator and that of an analog-digital converter are also different from each other. In such a situation, it is an important issue to determine a frequency at which each of the circuit blocks operates from the viewpoint of improving circuit characteristics such as the S/N ratio and distortion.

Such a problem may occur not only in the FM transmitter but also in a analog/digital hybrid circuit in which both of a digital circuit and an analog circuit are integrated.

SUMMARY OF THE INVENTION

The present invention has been achieved in view of such problems and a general purpose of the invention is to provide a circuit for making a digital circuit and an analog circuit operate synchronously with proper clocks.

An embodiment of the present invention relates to an analog/digital circuit. The analog/digital circuit includes: a first digital computing unit that operates on the basis of a first clock having a first frequency; a second digital computing unit that operates on the basis of a second clock having a second frequency which is higher than the first frequency and is asynchronous with the first clock, and performs a predetermined process on output data of the first digital computing unit; an analog circuit that operates on the basis of a third clock having a third frequency whose origin is the same as that of the second clock, and performs a predetermined process on an output signal of the second digital computing unit; and a sampling converter that receives output data having the first frequency from the first digital computing unit, converts a sampling frequency to data synchronized with the second clock, and outputs the obtained data to the second digital computing unit.

The expression "operate on the basis of a clock" denotes the case where the timing of the circuit is controlled by the clock and includes the case where, for example, input or output of a signal is controlled by the clock. An internal process of the circuit may use another clock.

In the embodiment, by providing the sampling converter between the first digital computing unit that operates synchronously with the first and second clocks which are asynchronous and the second digital computing unit, the first and second digital computing units can be operated at different proper frequencies.

The analog/digital circuit may further include: a frequency divider that divides the third clock having the third frequency f3 at a variable frequency dividing ratio M, thereby generating the second clock; and a frequency dividing ratio setting unit that sets the second frequency f2 on the basis of the values of the third and first frequencies f3 and f1.

An analog/digital circuit of an embodiment may be an FM transmitter. In the FM transmitter, the first digital computing unit may include a digital filter that filters an input signal. The second digital computing unit may include a digital stereo modulator that stereo-modulates an output signal of the digital filter, thereby generating a stereo composite signal. The analog circuit may include: a digital-to-analog converter that digital-to-analog-converts the stereo composite signal; and a frequency modulator that modulates the frequency of a carrier wave corresponding to the third clock using the stereo composite signal obtained by the digital-to-analog conversion as a modulation signal.

The first frequency f1 and the second frequency f2 may be set so as to satisfy the following relational expressions (1) and (2).

$$f\max < f2 - f1 \times K \times N - f\text{in} \quad (1)$$

$$f\max < f1 \times K \times (N+1) - f2 - f\text{in} \quad (2)$$

where
K: over-sampling rate of sampling converter
N: integer
fin: maximum frequency of input signal
fmax: maximum frequency of stereo composite signal.

The FM transmitter may further include: a frequency divider that divides the third clock having the third frequency f3 at a variable frequency dividing ratio M, thereby generating the second clock; and a frequency dividing ratio setting unit that sets the frequency dividing ratio M of the frequency divider so that second frequency obtained by f2=f3/M satisfies the expressions (1) and (2).

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 2A and 2B are block diagrams of an FM transmitter having a configuration different from that of the FM transmitter of the embodiment.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the specification, "a state where a member A is connected to a member B" includes the case where the members A and B are physically directly connected to each other, and the case where the members A and B are indirectly connected to each other via another member which does not exert an influence on the electric connection state.

Similarly, "a state where a member C is provided between the members A and B" includes the case where the members A and C or the members B and C are directly connected to each other and the case where the members A and C or the members B and C are indirectly connected to each other via another member which does not exert an influence on the electric connection state.

Figure 1:
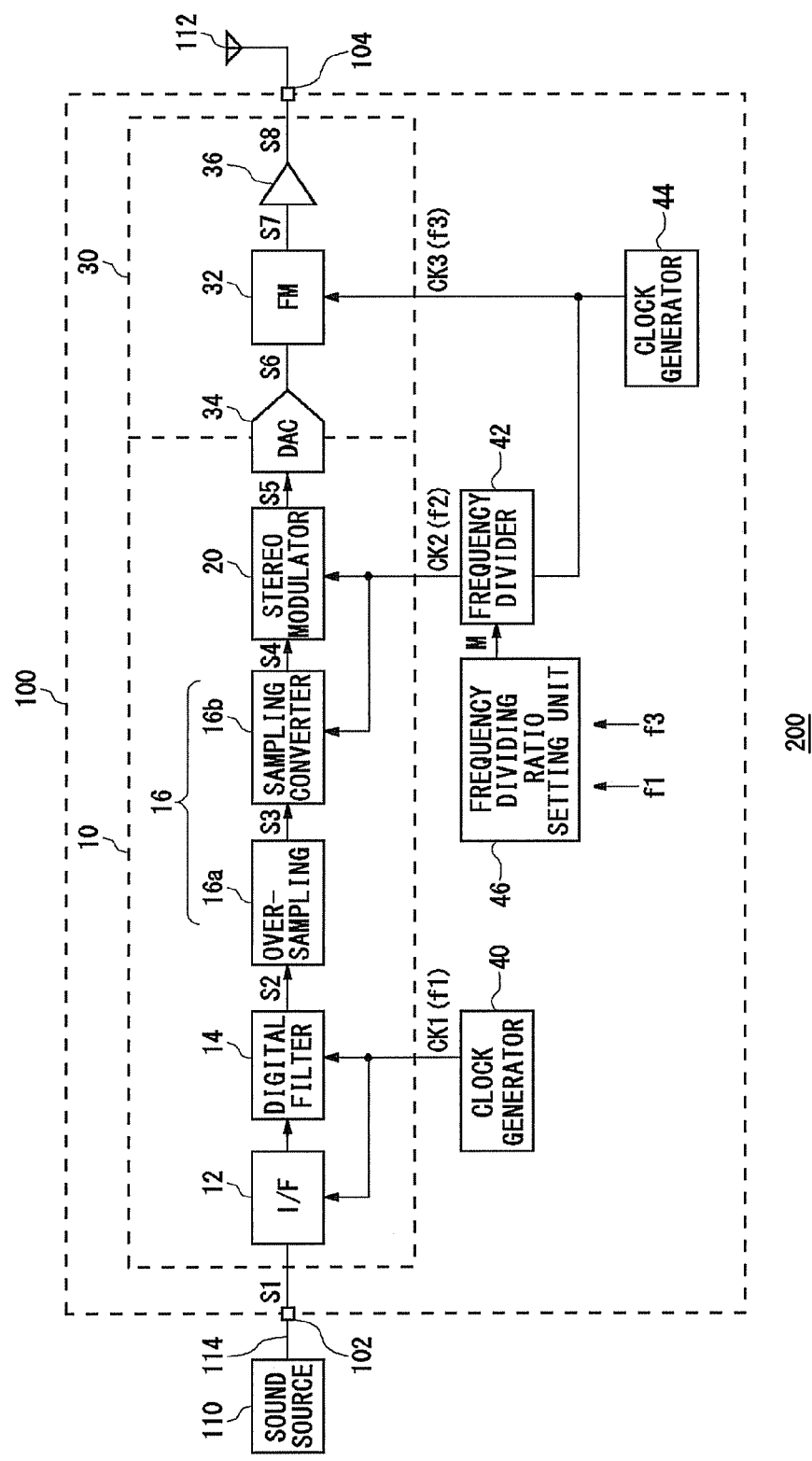
FIG. 1 is a block diagram showing a configuration of an electronic device on which an FM transmitter of an embodiment of the invention is mounted.

FIG. 1 is a block diagram showing a configuration of an electronic device 200 on which an FM transmitter 100 of an embodiment of the invention is mounted. The electronic device 200 is, for example, a cellular phone terminal, a radio receiver, or a silicon audio player, and has an audio reproduction function. An audio signal to be reproduced can be output from an electroacoustic transducer itself such as a speaker or earphone of the electronic device 200. In addition, the electronic device 200 can frequency-modulate an audio signal and transmit the frequency-modulated audio signal as electric waves to the outside in order to realize higher sound-quality audio reproduction. The user can receive the transmitted signal by an external audio player and reproduce the received signal with higher sound quality.

The FM transmitter 100 of the embodiment is an analog/digital hybrid circuit including an analog circuit and a digital circuit. The FM transmitter 100 can transmit character data or the like in addition to audio data.

The electronic device 200 has a sound source 110, the FM transmitter 100, and an antenna 112.

The sound source 110 outputs an audio signal S1. For example, the audio signal S1 may be a signal obtained by receiving and demodulating broadcast waves or a signal obtained by reproducing data stored in a memory. Any method may be used to generate the audio signal S1. The sound source 110 and the FM transmitter 100 are connected to each other via a bus 114 of a predetermined format. For example, the bus 114 is an I2S bus. In this case, the audio signal S1 is transmitted as serial data between the sound source 110 and the FM transmitter 100.

The FM transmitter 100 receives the audio signal S1 from the sound source 110. The FM transmitter 100 includes a digital circuit 10, an analog circuit 30, and other circuit blocks which are monolithically integrated on a single substrate as an analog/digital hybrid circuit. FIG. 1 shows only main circuit blocks extracted, and the other blocks are not appropriately shown.

The digital circuit 10 includes an interface unit 12, a digital filter 14, a sampling converter 16, and a stereo modulator 20. The analog circuit 30 includes a frequency modulator 32 and a power amplifier 36. It can be interpreted that a digital-to-analog converter (hereinbelow, called DAC) 34 is included in any of the digital circuit 10 and the analog circuit 30. In the following description, it is assumed that the DAC 34 is included in the analog circuit 30. The digital circuit 10 executes two digital computing processes. One of the processes is a filtering process and the other one is stereo modulation. Therefore, the digital filter 14 is also called a first digital computing unit, and the stereo modulator 20 is also called a second digital computing unit.

First, the digital circuit 10 will be described. To the digital circuit 10, a not-shown system clock of a few MHz is supplied. The computing process is executed synchronously with the system clock.

The interface unit 12 receives the audio signal S1 from the sound source 110 via an input terminal 102. The interface unit 12 receives the audio signal S1, converts it to parallel data, and outputs the parallel data to the digital filter 14. The digital filter 14 includes a pre-emphasis circuit and a low-pass filter. The digital filter 14 is a first digital computing unit and operates synchronously with a first clock CK1 having a first frequency f1. A clock generator 40 generates the first clock CK1 as a word clock having the first frequency f1=32 kHz, 44.1 kHz, 48 kHz, or the like. The clock generator 40 may be provided on the outside of the FM transmitter 100. The digital filter 14 emphasizes components equal to or higher than the cut-off frequency of the audio signal S1 in the pre-emphasis circuit and eliminates unnecessary high frequency components in the audio signal S1 in the low-pass filter. Using the first clock CK1, the digital circuit 10 latches the input audio signal S1 and controls a signal output timing.

The stereo modulator 20 is a second digital computing unit and operates synchronously with a second clock CK2 having a second frequency f2 higher than the first frequency f1. The first and second clocks CK1 and CK2 are generated independently of each other and are asynchronous with each other. The stereo modulator 20 as the second digital computing unit performs a predetermined process on output data of the digital filter 14 as the first digital computing unit. In the embodiment, the stereo modulator 20 performs stereo modulation as a predetermined process, thereby generating a stereo composite signal S5.

A clock generator 44 generates a third clock CK3 having a third frequency f3. The clock generator 44 is, for example, a PLL (Phase Locked Loop) or a crystal oscillator. A part or all of the clock generator 44 may be provided on the outside of the FM transmitter 100.

A frequency divider 42 receives the third clock CK3 and divides it at a variable frequency division ratio M, thereby generating the second clock CK2. That is, the relation of f2=f3/M is satisfied.

A frequency dividing ratio setting unit 46 receives the first and third frequencies f1 and f3. On the basis of the first and third frequencies f1 and f3, the frequency dividing ratio setting unit 46 sets the frequency dividing ratio M. The frequency dividing ratio setting unit 46 may have a table indicative of the correspondence between the values of the first and third frequencies f1 and f3 and the frequency dividing ratio M to be set. The table may be provided on the outside of the FM transmitter 100.

To the frequency dividing ratio setting unit 46, (i) both of the first and third frequencies f1 and f3 may be input, or (ii) only one of the first and third frequencies f1 and f3 is input and the other frequency may be obtained by using a known frequency ratio. The frequency dividing ratio M will be described later.

To maintain the matching of the timings of transmitting/receiving signals between the digital filter 14 and the stereo modulator 20 operating synchronously with the first and second clocks CK1 and CK2 which are asynchronous with each other, the sampling converter 16 is provided between the digital filter 14 and the stereo modulator 20.

The sampling converter 16 receives output data having the first frequency f1 from the digital filter (first digital computing unit) 14, converts the sampling frequency to data S4 synchronized with the second clock CK2, and outputs the data S4 to the stereo modulator (second digital computing unit) 20.

The sampling converter 16 includes an over-sampling circuit 16a and a sampling converter 16b.

The over-sampling circuit 16a receives and over-samples outputs (hereinbelow, called audio signals S2) of the digital filter 14. An over-sampling rate K is set so that the frequency of an over-sampling signal S3 becomes close to the second frequency f2 of the second clock CK2. In the following, an output of the over-sampling circuit 16a will be called the over-sampling signal S3.

The sampling converter 16b receives the over-sampling signal S3 from the over-sampling circuit 16a and computes data at a sampling point synchronized with the second clock CK2 by an interpolating process.

The analog circuit 30 provided at the post stage of the stereo modulator 20 as the second computing processing unit operates synchronously with the third clock CK3 of the third frequency f3. Since the second clock CK2 is obtained by dividing the frequency of the third clock CK3, it can be said that the second clock CK2 and the third clock CK3 have the same origin.

The analog circuit 30 performs a predetermined process on an output signal of the stereo modulator 20. In the embodiment, the analog circuit 30 includes the DAC 34, the frequency modulator 32, and the power amplifier 36. The DAC 34 digital-to-analog-converts the stereo composite signal S5. The frequency modulator 32 modulates the frequency of a carrier wave corresponding to the third clock CK3 using the digital-to-analog-converted stereo composite signal S6 as a modulation signal. For example, the carrier wave may have a frequency obtained by multiplying the third frequency f3 of the third clock CK3.

The power amplifier 36 amplifies a modulated signal S7 output from the frequency modulator 32 and outputs the amplified signal from an output terminal 104. To the output terminal 104, the antenna 112 is connected via a not-shown matching circuit.

Next, the relation between the first and second frequencies f1 and f2 will be described. The FM transmitter 100 of the embodiment has an effect such that the first and second frequencies f1 and f2 can be set independently of each other. However, when the frequencies are set independently of each other, aliasing noise occurs. To suppress the aliasing noise, the first and second frequencies f1 and f2 are set as follows.

The maximum frequency of the audio signal S1 will be expressed as fin1. Since a normal audio signal have a frequency component of about 0 to 15 kHz, in this case, fin1 equals to 15 kHz.

The maximum value of the frequency component of the stereo composite signal S5 output from the stereo modulator 20 will be expressed as fmax. In the case where the audio signal S1 has a frequency component of 0 to 15 kHz, the maximum frequency fmax of the frequency component of the stereo composite signal S5 is expressed as follows.

$$fmax = fs1 + fin1$$

where fs1 denotes the frequency of a sub-carrier of stereo modulation. When it is assumed to satisfy the relation of fin1=15 kHz and fs=38 kHz, fmax equals to about 53 kHz.

In the case where the stereo modulator 20 modulates RDS/RBDS data, the maximum frequency fmax of the stereo composite signal S5 becomes as follows.

In modulation of the RDS/RBDS data, the amplitude of the sub-carrier having the frequency fs2=57 kHz is modulated with the RDS/RBDS data having the maximum frequency fin2 of about 1 to 3 kHz. Therefore, the maximum frequency fmax of the stereo composite signal S5 at this time is expressed as follows.

$$fmax = fs2 + fin2$$

where fin2 denotes the maximum frequency (about 3 kHz) of the RDS/RBDS data. Therefore, when the stereo composite signal S5 includes the RDS/RBDS data, the maximum frequency fmax is expressed as follows.

$$fmax = 57 + 3 = 60 \text{ kHz}$$

When the maximum frequency fmax of the stereo composite signal S5 and the maximum frequency fin of an input signal, each of which is 15 kHz, are used as parameters, it is desirable that the first frequency f1 and the second frequency f2 satisfy the relations of equations (1) and (2).

$$fmax < f2 - f1 \times k \times N - fin \quad (1)$$

$$fmax < f1 \times k \times (N+1) - f2 - fin \quad (2)$$

where N denotes an integer.

When one of the first and second frequencies f1 and f2 is determined, the other one can be determined by the equations (1) and (2). When the first frequency f1 is set to any of 32 kHz, 44.1 kHz, and 48 kHz of a word clock, the second frequency f2 is determined according to the set value. For example, f1=44.1 kHz and fmax=53 kHz (no RDS/RBDS data), the second frequency f2 is set to 430 to 460 kHz.

The frequency dividing ratio setting unit 46 controls the frequency dividing ratio M of the frequency divider 42 to obtain the necessary second frequency f2. That is, based on the equations (1) and (2), the second frequency f2 is determined. The second frequency f2 and the third frequency f3 satisfy the following relation.

$$f2 = f3/M \quad (3)$$

Therefore, when f1 and f3 are determined, the necessary frequency dividing ratio M can be properly set by the equations (1) and (2).

The configuration and operation of the FM transmitter 100 have been described above. The effects of the FM transmitter 100 of the embodiment become clearer from comparison with an FM transmitter having another configuration shown in FIGS. 2A and 2B.

FIGS. 2A and 2B are block diagrams of FM transmitters 300a and 300b each having a configuration different from that of the FM transmitter 100 of the foregoing embodiment.

In the FM transmitter 300a of FIG. 2A, the first and second clocks CK1 and CK2 are, for example, signals each obtained by multiplying the clock with a common clock signal or dividing the frequency of the clock by a not-shown PLL and are synchronized with each other. Therefore, the sampling converter 16b in FIG. 1 becomes unnecessary, and only the over-sampling circuit 16a is provided. Other configurations are similar to the configuration of FIG. 1.

In the FM transmitter 300a of FIG. 2A, the second clock CK2 to be supplied to the stereo modulator 20 and the third clock CK3 supplied to the frequency modulator 32 are generated independently of each other, they are asynchronous. Therefore, the stereo modulation of the stereo modulator 20 and the frequency modulation of the frequency modulator 32 are performed asynchronously, so that a beat having a frequency component of abs ($\alpha \times f3 - \beta \times f2$) is generated, and characteristics deteriorate. $\alpha$ and $\beta$ are integers and abs( ) expresses the absolute value.

On the other hand, in the FM transmitter 100 of FIG. 1 of the embodiment, the stereo modulator 20 and the frequency modulator 32 operate synchronously with the second and third clocks CK2 and CK3 having the same origin. Consequently, generation of a beat can be suppressed, and the characteristics can be improved.

Further, in the FM transmitter 100 of the embodiment, the first and second frequencies f1 and f2 are determined so as to satisfy the equations (1) and (2), so that aliasing noise can be excellently suppressed. In the case where the first frequency f1 is switched among some values, by providing the frequency dividing ratio setting unit 46, the second frequency f2 can be properly set according to the first frequency f1.

Concretely, when fmax=60 kHz, fin=15 kHz, f1=48 kHz, k=4, and N=2, it is sufficient to set f2 in the range of 460 to 500 kHz. On the other hand, by properly setting the range of the second frequency f2, desired characteristics can be obtained while setting an over-sampling rate K of the over-sampling circuit 16a to be low.

There are the following advantages when the FM transmitter 100 is compared with the FM transmitter 300b of FIG. 2B.

The signal process order in the FM transmitter 300b of FIG. 2B is different from that of the FM transmitter 100 of FIG. 1. Specifically, in the FM transmitter 300b of FIG. 2B, the sampling converter 16 is provided at the next stage of the interface unit 12. The digital filter 14 as the first digital computing unit and the stereo modulator 20 as the second digital computing unit operate on the basis of the second clock CK2 of the second frequency f2 higher than the first frequency f1. In the circuit of FIG. 2B, the second and third clocks CK2 and CK3 are synchronized with each other. In the configuration, the stereo modulator 20 and the frequency modulator 32 operate synchronously with each other, so that a beat can be suppressed. However, not only the stereo modulator 20 but also the digital filter 14 operate at the high second frequency f2, power consumption increases.

In contrast, in the FM transmitter 100 of the embodiment, the first digital computing unit (the digital filter 14) is operated at the relatively low first frequency f1 and only the second digital computing unit (the stereo modulator 20) can be operated at the higher second frequency f2. Thus, power consumption can be reduced.

Figure 3:
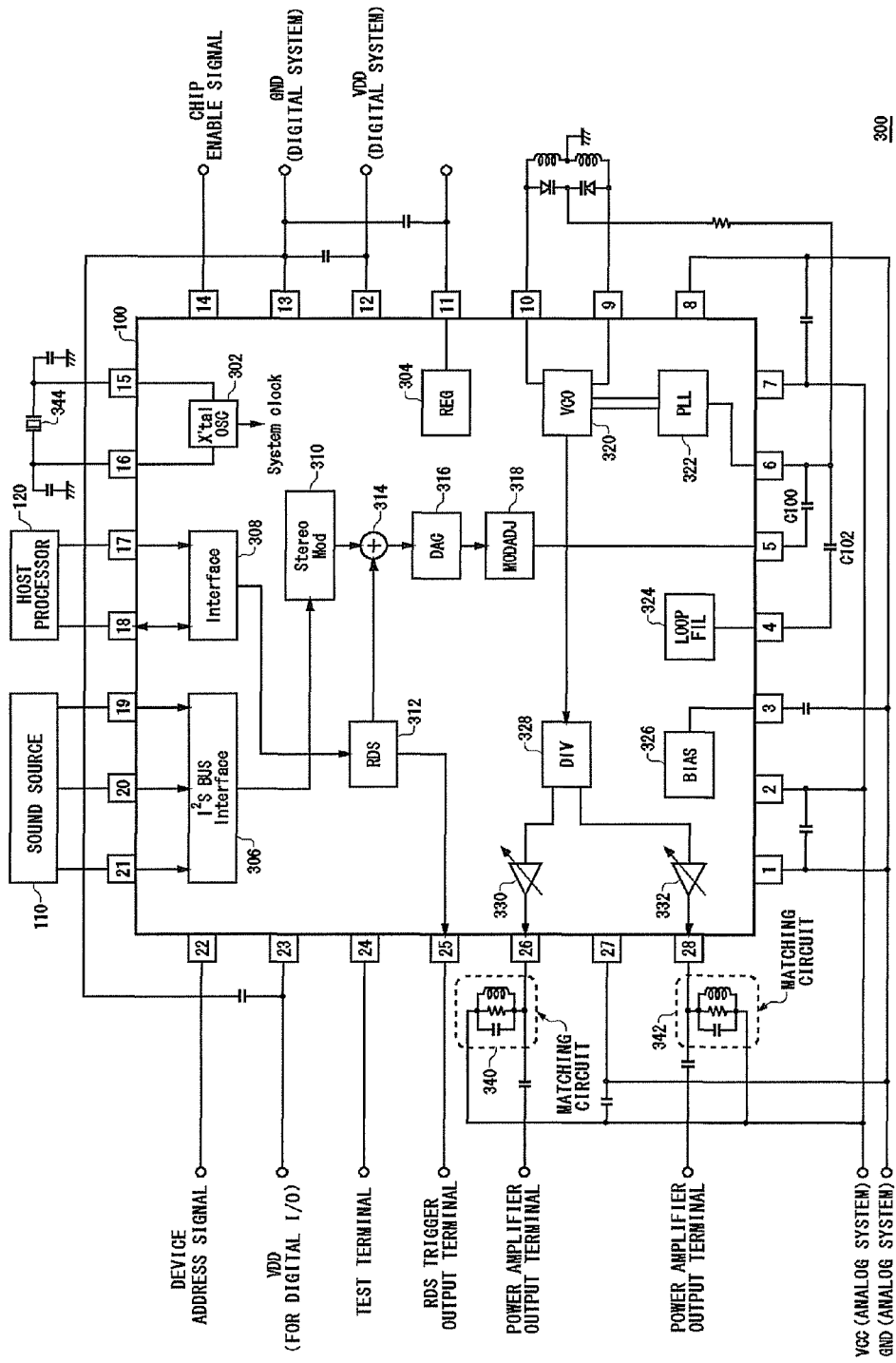
FIG. 3 is a circuit diagram of an FM transmitter and peripheral circuits.

FIG. 3 is a circuit diagram of the FM transmitter 100 and peripheral circuits. The IC of the FM transmitter 100 has first to $28^{th}$ pins.

To the first, second, seventh, eighth, and twenty-seventh pins, the power supply voltage Vcc for analog circuits in the FM transmitter 100 and the ground voltage GND are supplied. To the $12^{th}$, $13^{th}$, and $23^{rd}$ pins, the power supply voltage Vdd for digital circuits and the ground voltage GND are supplied.

A regulator 304 generates voltage used in an internal logic of the FM transmitter 100. From the $11^{th}$ pin, the voltage generated by the regulator 304 is output.

To the $19^{th}$ to $21^{st}$ pins, the sound source 110 is connected via the I2S bus. The $19^{th}$ pin is for data, the $20^{th}$ pin is for clocks, and the $21^{st}$ pin is for LR clocks. An I2S bus interface unit 306 transmits/receives data to/from the sound source 110.

To the $17^{th}$ and $18^{th}$ pins, the host processor 120 is connected via the I2C bus. The $17^{th}$ pin is for a clock signal, and the $18^{th}$ pin is for a data signal.

To the $15^{th}$ and $16^{th}$ pins, a crystal oscillator 344 is connected. An oscillator 302 provides a system clock.

A chip enable signal is input to the $14^{th}$ pin. By the chip enable signal, the FM transmitter 100 is switched between a normal operation mode and a power-down mode. In the power-down mode, internal circuits are shut down, current consumption becomes almost zero, and signals from the outside are not accepted.

To the $22^{nd}$ pin, a device address selection signal is input. When an LSI controlled by a common I2C bus exists other than the FM transmitter 100, the $22^{nd}$ pin is provided to distinguish between the FM transmitter and the LSI. The $24^{th}$ pin is a terminal for test.

The $25^{th}$ pin is a trigger output signal for RDS. An RDS digital modulator 312 notifies the circuit blocks other than the FM transmitter 100 via the $25^{th}$ pin of the fact that an RDS signal is transmitted from the outside to the FM transmitter 100.

A stereo modulator 310 receives an audio signal received from the sound source 110 and stereo-modulates the audio signal, thereby generating a stereo composite signal. The RDS digital modulator 312 sequentially reads data from the host processor 120, performs binary phase shift keying, filters the data, and outputs the resultant data. An adder 314 adds RDS/RBDS data output from the RDS digital modulator 312 with the stereo composite signal.

A DAC 316 digital-to-analog-converts an output of the adder 314. The amplitude of the DAC 316 is adjusted by a modulation degree adjuster 318, and the resultant data is supplied to a PLL 322 via the fifth pin, an external capacitor C100, and the sixth pin. The sixth pin is connected to a loop filter 324 via a capacitor C102 and the fourth pin (PLL time constant switching terminal). The loop filter 324 is formed by the capacitor C102 connected to the fourth pin and a not-shown resistor in the FM transmitter 100. By changing the capacitance value of the capacitor C102 or changing the resistance value, the time constant is adjusted.

A VCO 320 oscillates at a frequency according to a signal from the PLL and supplies a frequency-modulated signal to a divider 328. To the VCO 320, a variable capacitance diode and an inductor are connected via the ninth and tenth pins.

The FM transmitter 100 has power amplifiers of two systems. The divider 328 outputs signals to power amplifiers 330 and 332. An output of the power amplifier 330 is supplied from the $26^{th}$ pin to the outside. To the $26^{th}$ pin, a matching circuit 340 is connected. An output of the power amplifier 332 is supplied from the $28^{th}$ pin to the outside. To the $28^{th}$ pin, a matching circuit 342 is connected. By providing the two systems of the power amplifiers and matching circuits, the frequency characteristic can be adjusted according to a load (antenna) of each of the systems.

The correspondence between FIGS. 1 and 3 is as follows. Interface unit 12: interface 306

Digital filter 14: not shown
Sampling converter 16: not shown
Stereo modulator 20: stereo modulator 310
DAC 34: DAC 316
Frequency modulator 32: modulation degree adjuster 318, loop filter 324, PLL 322, and VCO 320
Power amplifier 36: divider 328 and power amplifiers 330 and 332

The present invention has been described above on the basis of the embodiment. It is to be understood by a person skilled in the art that the embodiment is illustrative and the combination of the components and processes of the embodiment can be variously modified, and such modifications are also in the scope of the present invention. The modifications will be described below.

The embodiment has been described with respect to the case of the FM transmitter 100 as an example in which the first digital computing unit is the digital filter 14, the second digital computing unit is the stereo modulator 20, and a process of the analog circuit is frequency modulation. The invention is not limited to the case. The first digital computing unit, the second digital computing unit, and the analog circuit may perform different processes. The FM transmitter 100 of the embodiment is abstracted and generalized as follows.

The first digital computing unit (14) operates synchronously with the first clock CK1 having the first frequency f1. The second digital computing unit (20) operates synchronously with the second clock CK2 having the second frequency f2 higher than the first frequency f1 and being asynchronous with the first frequency f1. The second digital computing unit (20) performs a predetermined process on output data of the first digital computing unit (14). The analog circuit (32) operates synchronously with the third clock CK3 having the third frequency f3 whose origin is the same as that of the second clock CK2. The analog circuit (30) performs a predetermined process on an output signal of the second digital computing unit (20). The sampling converter (16) receives output data having the first frequency f1 from the first digital computing unit 14, converts the sampling frequency to data synchronized with the second clock CK2, and outputs the obtained data to the second digital computing unit (20).

In the circuit, while setting the operation frequencies of the first and second digital computing units independently of each other, the second digital computing unit and the frequency modulator can be made operate synchronously with each other.

While the preferred embodiments of the present invention have been described using specific terms, such description is for illustrative purposes only, and it is to be understood that changes and variations may be made without departing from the spirit or scope of the appended claims.

What is claimed is:
1. An analog/digital circuit comprising:
a first digital computing unit that operates on the basis of a first clock having a first frequency;
a second digital computing unit that operates on the basis of a second clock having a second frequency which is higher than the first frequency and is asynchronous with the first clock, and performs a predetermined process on output data of the first digital computing unit;
an analog circuit that operates on the basis of a third clock having a third frequency whose origin is the same as that of the second clock, and performs a predetermined process on an output signal of the second digital computing unit; and
a sampling converter that receives output data having the first frequency from the first digital computing unit, converts a sampling frequency to data synchronized with the second clock, and outputs the obtained data to the second digital computing unit.

2. The analog/digital circuit according to claim 1, further comprising:
a frequency divider that divides the third clock having the third frequency f3 at a variable frequency dividing ratio M, thereby generating the second clock; and
a frequency dividing ratio setting unit that sets the second frequency f2 on the basis of the values of the third and first frequencies f3 and f1.

3. The analog/digital circuit according to claim 1, wherein the circuit is an frequency modulation (FM) transmitter,
the first digital computing unit includes a digital filter that filters an input signal,
the second digital computing unit includes a digital stereo modulator that stereo-modulates an output signal of the digital filter, thereby generating a stereo composite signal, and
the analog circuit includes:
a digital-to-analog converter that digital-to-analog-converts the stereo composite signal; and
a frequency modulator that modulates the frequency of a carrier wave corresponding to the third clock using the stereo composite signal obtained by the digital-to-analog conversion as a modulation signal.

4. The analog/digital circuit according to claim 3, wherein the first frequency f1 and the second frequency f2 are set so as to satisfy the following relational expressions (1) and (2) using an over-sampling rate K of the sampling converter, an integer N, maximum frequency fin of an input signal, and maximum frequency fmax of the stereo composite signal $$f\max < f2 - f1 \times K \times N - fin \quad (1)$$

$$f\max < f1 \times K \times (N+1) - f2 - fin \quad (2).$$

5. The analog/digital circuit according to claim 4, further comprising:
a frequency divider that divides the third clock having the third frequency f3 at a variable frequency dividing ratio M, thereby generating the second clock; and
a frequency dividing ratio setting unit that sets the frequency dividing ratio M of the frequency divider so that second frequency f2 obtained by f2=f3/M satisfies the expressions (1) and (2).

* * * * *